United States Patent
Freiburger et al.

(10) Patent No.: US 6,364,838 B1
(45) Date of Patent: Apr. 2, 2002

(54) PULSED WAVE DOPPLER PROCESSING USING ALIASED SPECTRAL DATA

(75) Inventors: Paul D. Freiburger, Bellevue; Barry H. Friemel, Redmond, both of WA (US)

(73) Assignee: Siemens Medical Soulutions, USA, Inc., Iselin, NJ (US)

( * ) Notice: Subject to any disclaimer, the term of this patent is extended or adjusted under 35 U.S.C. 154(b) by 0 days.

(21) Appl. No.: 09/481,133

(22) Filed: Jan. 11, 2000

(51) Int. Cl.[7] ................................................. A61B 8/06
(52) U.S. Cl. ....................................................... 600/455
(58) Field of Search ................................ 600/453–456, 600/441; 73/861.25

(56) References Cited

U.S. PATENT DOCUMENTS

| | | | | |
|---|---|---|---|---|
| 4,265,126 A | * | 5/1981 | Papadofrangakis et al. | 600/441 |
| 4,534,357 A | * | 8/1985 | Powers | 600/455 |
| 4,848,354 A | * | 7/1989 | Angelsen et al. | 600/455 |
| 4,930,514 A | * | 6/1990 | Baba et al. | 600/455 |
| 5,016,641 A | * | 5/1991 | Schwartz | 600/455 |
| 5,183,047 A | * | 2/1993 | Burckhardt | 600/455 |
| 5,220,923 A | * | 6/1993 | Hagiwara et al. | 600/455 |
| 5,476,097 A | * | 12/1995 | Robinson | 600/441 |
| 5,553,621 A | * | 9/1996 | Otterson | 600/455 |
| 5,560,363 A | * | 10/1996 | Torp et al. | 600/455 |
| 5,642,732 A | * | 7/1997 | Wang | 600/453 |
| 5,732,044 A | * | 3/1998 | Jarvis | 367/134 |
| 5,845,004 A | * | 12/1998 | Banjanin et al. | 382/128 |

* cited by examiner

*Primary Examiner*—Francis J. Jaworksi

(57) ABSTRACT

A method for producing Doppler ultrasound data at a user-requested pulse repetition frequency (PRF) utilizing undersampled echo signals. Echo signals are created in response to Doppler pulses that are transmitted into the patient at a rate less than a desired PRF. The echo signals are analyzed in the time domain to determine a velocity of scatterers in an area of tissue defined by a range gate. From the velocity, the Doppler shift of the scatterers is determined. The echo signals are interpolated to produce a number of samples equal in number to that which would have been produced had the Doppler pulses been transmitted at the user-requested PRF. The interpolated echo signals are then analyzed in the frequency domain which produces a number of spectra indicative of the velocity and direction of the moving scatterers. From the Doppler shift determined, the correct spectra is selected and displayed for a user. In addition, the present invention can be used to increase the amplitude of the pulses transmitted into a patient by lowering the transmit pulse frequency so that the total amount of ultrasonic energy delivered to the patient remains the same. The larger amplitude transmit pulses produce echo signals having a better signal-to-noise ratio.

13 Claims, 3 Drawing Sheets

PULSED WAVE DOPPLER PROCESSING USING ALIASED SPECTRAL DATA

FIELD OF THE INVENTION

The present invention relates to ultrasound systems in general and pulsed wave Doppler ultrasound systems in particular.

BACKGROUND OF THE INVENTION

Ultrasound is becoming a commonly used technique to diagnose vascular diseases. By providing data regarding the rate of blood flow through a patient's heart or blood vessels, a physician or sonographer is able to detect many vascular or cardiac diseases.

Most ultrasound systems utilize Doppler processing to analyze moving blood flow. In Doppler processing, ultrasound pulses are delivered to the patient and focused at a particular area of tissue defined by a range gate. Echo signals generated in response to the pulses are analyzed to determine the frequency shift of the received echoes compared to the transmitted pulse, i.e., the Doppler shift of the received echo signal. The magnitude and sign (positive or negative) of the Doppler shift are proportional to the velocity and direction of the moving blood flow and can therefore provide information concerning the health of the tissue in the area of the range gate.

As will be appreciated by those skilled in the art, sampling theory dictates that in order to accurately analyze the moving blood flow, samples of the blood flow must be obtained at a rate that is twice as fast as the highest frequency component of the flow. The speed at which sound can travel in the body presents a limiting factor in how fast the blood flow can be sampled. In pulse mode Doppler, whereby echo signals are received from the body during the time period that extends between transmit pulses, the depth of tissue that can be analyzed is limited by the distance that a pulse and corresponding echo can travel between transmit pulses. For example, if a user requests a pulse repetition frequency (PRF) of 40 kHz, a pulse is transmitted into the patient every 25 microseconds. In this period of time, an ultrasound pulse having an average velocity of 1.54 mm/microsecond can only travel 19.25 mm into a patient's body in order to give the echo signal enough time to return to the transducer before the next pulse is transmitted. When analyzing a patient's heart muscle, scan depths of 80–100 mm are often required. To scan at these depths, it has been generally necessary to reduce the PRF below the rate requested by a user, which results in a loss of high frequency detail and aliasing of the echo data.

To scan at greater depths, without the loss of detail, some ultrasound systems use a continuous wave (CW) Doppler system whereby a pulse is continually delivered to the patient and echo signals are continuously received. However, CW Doppler systems require additional hardware to process the continuously received echo signals, thereby increasing the cost and complexity of the ultrasound system.

Another technique for increasing the depth at which tissue can be scanned is called high pulse repetition frequency (PRF) Doppler. In this method, periodic transmit pulses are delivered to the patient and echo signals are received between pulses. To achieve a greater scan depth, the echo signals are received from more than one depth at a time. For example, a first pulse is transmitted and an echo signal is received from a certain depth in the tissue. A second pulse is transmitted and echo signals are received from the first depth and from a second depth that is twice the first depth, etc. Although HPRF allows greater scanning depths, there is always some ambiguity concerning which depth produced a certain echo component.

Another limiting factor in ultrasound systems is the amount of ultrasonic energy that can be applied to a patient in a given amount of time. If the user requests a PRF that exceeds an energy threshold, the magnitude of each pulse that is delivered to the patient is decreased proportionally. The decrease in magnitude reduces the signal-to-noise ratio of the echo signals created, thereby making it more difficult to correctly analyze the speed and direction of moving blood flow.

Given these shortcomings in prior art Doppler ultrasound systems, there is a need for a mechanism that can analyze fast moving blood flow at relatively deep locations in the patient's body. In addition, the method should allow the use of relatively large amplitude pulses to improve the signal-to-noise ratio of the echo signals received.

SUMMARY OF THE INVENTION

To perform Doppler processing at high pulse repetition frequencies and at greater depths in the patient's body, the present invention creates Doppler data from undersampled echo signals. When a user requests a PRF which does not allow ultrasound signals to travel to the desired depth and back before another transmit pulse is to be sent, the PRF is slowed such that the echo signals received are undersampled. A time domain analysis is performed on echo signals received to estimate the distance that a group of scatterers (i.e., blood cells) moves between sequential transmit pulses. The time domain analysis is preferably a pattern recognition process such as a cross correlation or a sum of absolute differences technique. The velocity of the scatterers is calculated by dividing the distance estimated by the time between transmit pulses. From the velocity, the Doppler shift of the scatterers is calculated. The undersampled echo signals are then interpolated to create the number of samples that would be created if the echo signals were received at the desired PRF. The interpolated echo data is then subjected to a frequency domain analysis which creates multiple spectra of the tissue in the area of the range gate. Given the Doppler shift calculated from the time domain analysis, the appropriate spectra produced from the frequency domain analysis is selected and displayed for a user.

As an alternative to selecting the desired spectra after the frequency domain processing, it is also possible to filter the interpolated data with a low pass filter to remove any aliases. The filtered interpolated data can then be modulated by a carrier whose frequency is determined by the time domain analysis prior to analyzing the data in the frequency domain.

In one embodiment of the invention, the echo samples used for the time domain analysis are the same echo samples used for the frequency domain analysis. In another embodiment of the invention, separate echo signals are created for the time domain analysis by interspersing transmit pulses designed to produce optimum time domain echo signals with the transmit pulses designed to produce optimum echo signals for the frequency domain analysis. In yet another embodiment of the invention, the time domain transmit pulses have a different frequency than the frequency domain transmit pulses and the two are superimposed and simultaneously transmitted. Echo signals generated in response to the superimposed transmit pulses can be filtered to separate those echo signals due to the time domain transmit pulses and those due to the frequency domain transmit pulses.

In accordance with another aspect of the invention, the amplitude of the pulses transmitted into a patient can be increased if their frequency is decreased. Therefore, the invention can be used to undersample a region of tissue defined by a range gate with higher amplitude transmit pulses that are transmitted at a lower frequency. The echo signals created in response to the transmitted pulses are analyzed in the time domain to calculate the Doppler shift of scatterers within an area of tissue defined by a range gate. The echo signals are then interpolated to a user requested PRF and from the Doppler shift calculated, the correct spectra created by frequency domain processing of the interpolated echo signals can be calculated.

DETAILED DESCRIPTION OF THE PREFERRED EMBODIMENT

The present invention is a method for producing Doppler echo data at a high pulse repetition frequency (PRF) using undersampled echo signals received from a location in the patient's body.

Figure 1:
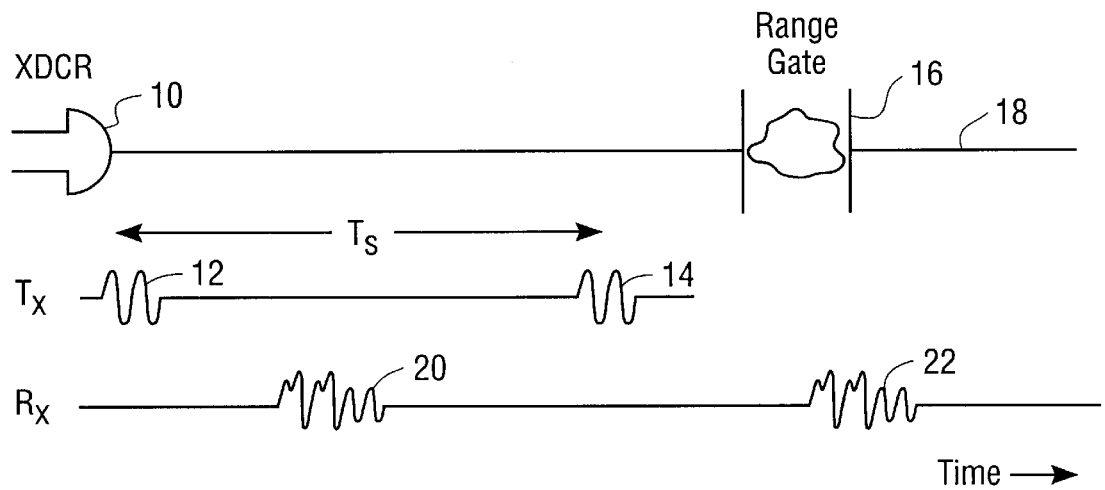
FIG. 1 illustrates how a conventional pulse Doppler ultrasound operates.

FIG. 1 illustrates a conventional method of using pulsed Doppler to analyze moving blood flow at a desired location in a patient's body. A transducer 10 transmits a series of transmit pulses 12, 14 . . . that are focused within an area of tissue defined by a range gate 16. A user positions the range gate 16 along a beam line 18 in order to select the area in the body in which the user wishes to analyze the speed and direction of moving blood flow.

The rate at which the transmit pulses 12, 14 . . . are transmitted is referred to as the pulse repetition frequency (PRF). Each transmit pulse is separated by a time period τ. For each transmit pulse delivered to the patient, an echo signal is received. For example, an echo signal 20 is received in response to the Doppler pulse 12 and an echo signal 22 is received in response to the Doppler pulse 14. The echo signals 20, 22 are received by the transducer, which converts them to corresponding electronic signals that are then digitized, demodulated, filtered and applied to a beamformer that focuses the received echo signals and produces a digital signal that is representative of the size and movement of the scatterers (i.e., blood cells) in the area of tissue defined by the range gate 16.

As indicated above, when the requested PRF of the ultrasound system is too high, the speed at which the transmit pulses 12, 14 and corresponding echo signals 20, 22 can travel in the body limits the depth at which the range gate can be placed. When the requested PRF is too high, the pulse 12 does not have time to travel from the transducer to the range gate and create an echo which is received at the transducer before the next transmit pulse 14 is transmitted.

Another limiting factor in pulse Doppler imaging is the level of ultrasonic energy that can be applied to the patient per unit time. As the PRF increases, the amplitude of each transmit pulse delivered to the patient is decreased in order to limit the total amount of ultrasonic energy delivered. However, reducing the amplitude of the transmit pulses 12, 14 reduces the signal-to-noise ratio of the corresponding echo signals created, thereby making it more difficult to distinguish moving blood flow from background noise or other tissue structure.

Figure 2A:
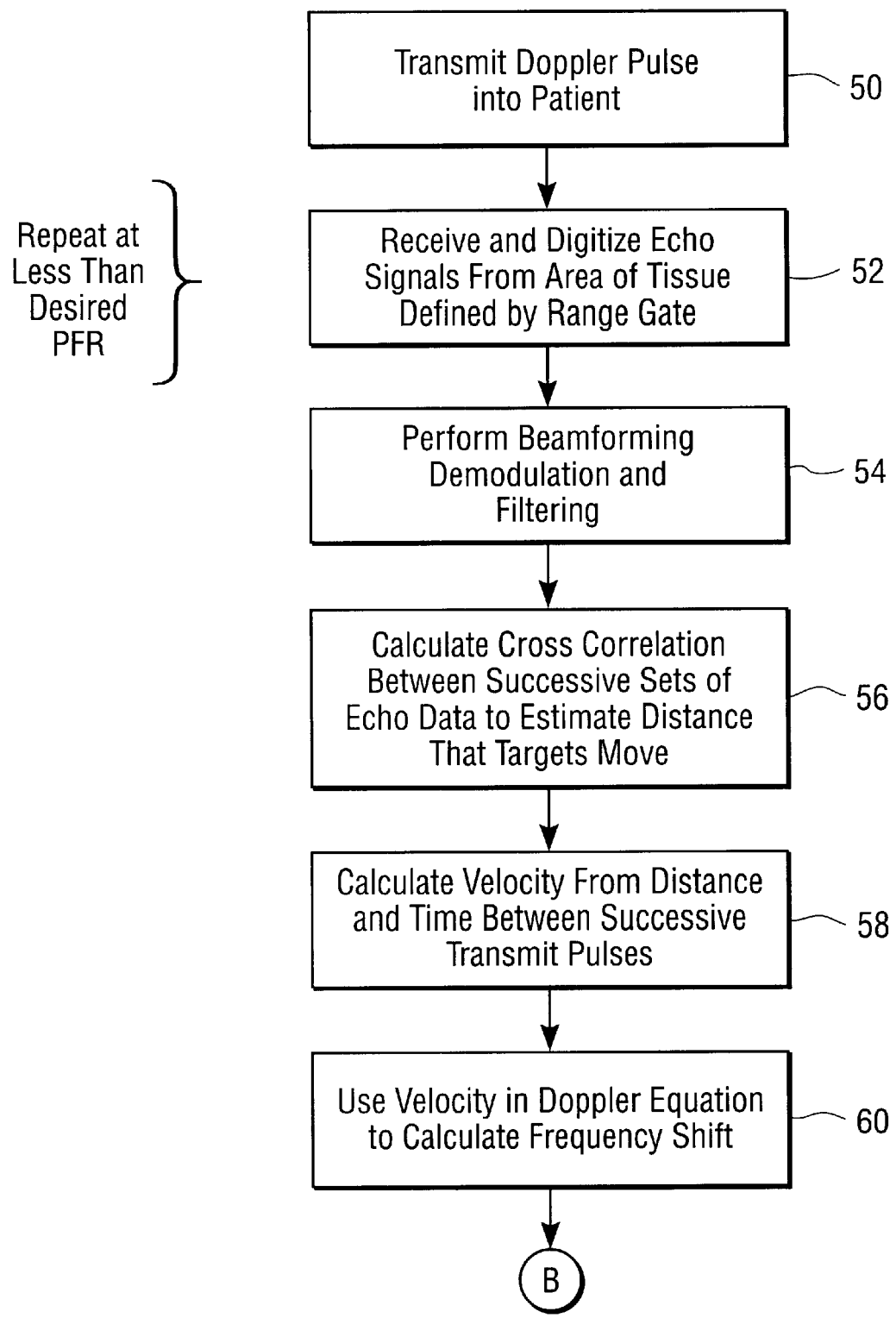
FIGS. 2A–2B illustrate the series of steps performed by one embodiment of the present invention to produce Doppler data from undersampled echo signals.
Figure 2B:
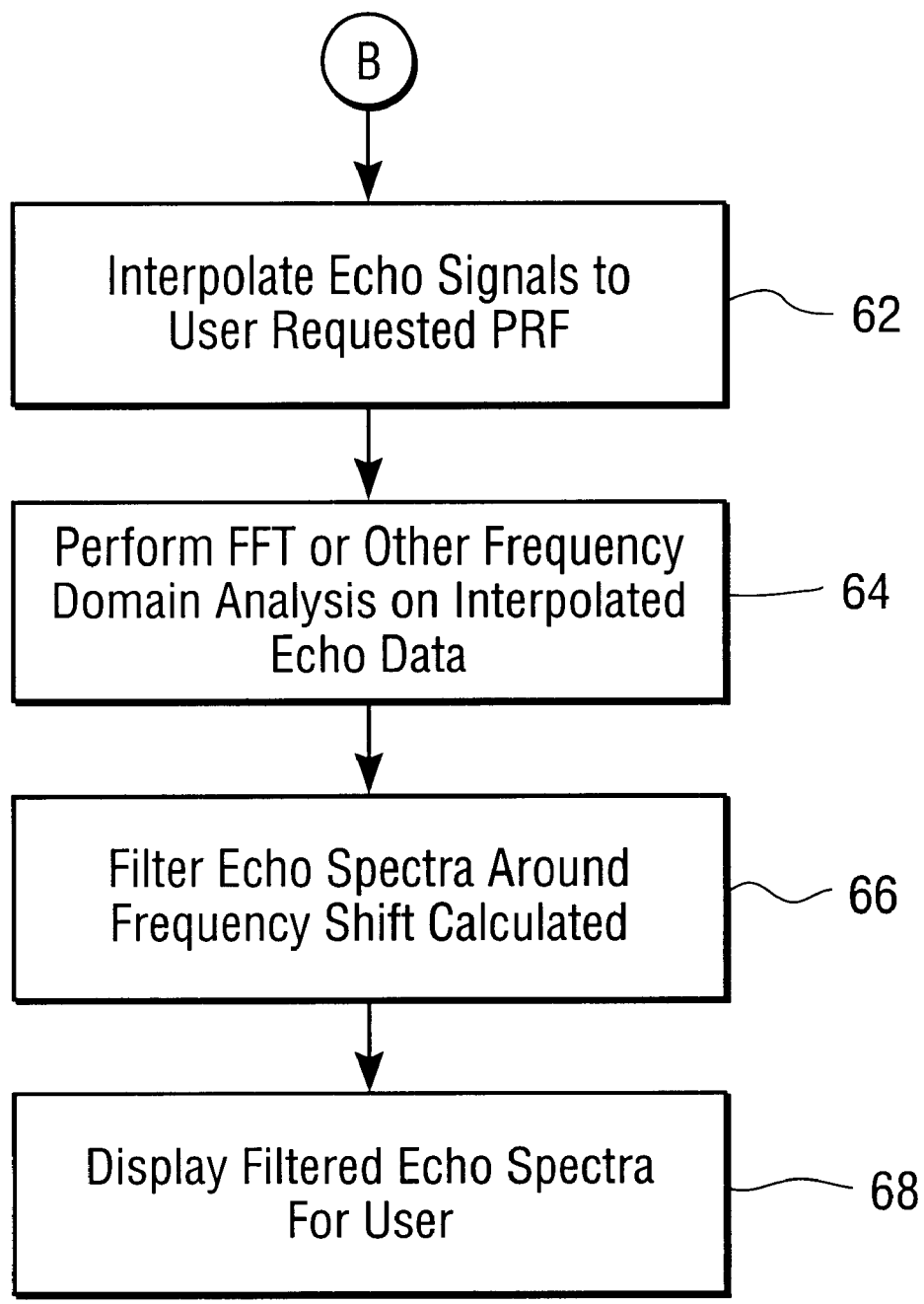

FIGS. 2A and 2B illustrate the steps performed by a currently preferred embodiment of the present invention to overcome the problems associated with the conventional method of performing pulsed Doppler ultrasound. To obtain ultrasound echo signals at a desired PRF from locations in the body that are deeper than the distance a pulse can travel between successive pulses, a Doppler pulse is transmitted into the patient at a step 50. At a step 52, an echo signal from an area of tissue defined by the rate gate is created in response to the Doppler pulse and is received and digitized. At a step 54, traditional echo processing is performed on the received echo signal including demodulation, filtering and beamforming to produce a digital echo signal having a magnitude and frequency components which are proportional to the size and velocity of the scatterers in the range gate.

The steps 50–54 are repeated at a rate which is less than a user-selected PRF. For example, if a user wants to view moving blood in the heart, he or she may request a PRF of 40–50 kHz. However, if the position of the range gate is too deep to allow echo signals to be received from that depth, steps 50–54 may be performed at a lower rate such as 10 kHz. By lowering the rate at which the Doppler pulses are transmitted, the echo signals generated within the range gate are effectively undersampled.

At a step 56, a time domain analysis is performed on successive received echo signals in order to estimate the distance that a group of scatterers, i.e., a group of blood cells, moves between pulses. For example, in one embodiment of the invention, a correlation is performed on the echo signal created in response to a first transmit pulse and the echo signal created in response to a subsequent transmit pulse. From the correlation function, the distance between a pattern in the two echo signals is estimated. Another time domain technique that could be used to estimate the distance is a sum of absolute differences calculation or any other function that estimates a distance between identifiable segments in sequentially obtained echo signals. It should be noted that although it is preferred to perform the time domain analysis on sequential echo signals, the echo signals need not be adjacent in time. For example, the first echo signal could be compared with the third echo or could be compared against more than one later occurring echo signal and the estimated distances averaged.

At a step 58, the velocity of the scatterers is calculated by dividing the distance estimated in step 56 by the time between the transmit pulses used to create the interpolated echoes. The velocity calculated at step 58 is used in the following Doppler equation in order to calculate a Doppler shift for the scatterers at a step 60.

$$f_{Doppler} = \frac{2 \cdot f_{tx} \cdot \text{Velocity of scatterers} \cdot \cos(\theta)}{\text{Velocity of sound in body}}$$

where $f_{Doppler}$ is the Doppler frequency shift of the scatterers and $f_{tx}$ is the frequency of the transmit pulses (i.e., less than the user-requested PRF).

Once the Doppler shift of the echo signals has been calculated from the time domain analysis, the echo signals are averaged over the range gate to produce a single averaged sample. The averaged samples from each of the Doppler pulses are then interpolated at a step 62 in order to provide the number of averaged samples that would have been produced had the Doppler pulses transmitted at a step 50 been sent at the user-requested PRF. For example, if the user requests a PRF of 40 kHz but the system actually sends the transmit pulses at 10 kHz, then the interpolation function calculates three additional averaged samples to fill in the time between actual averaged samples. No low pass filtering is done in order to preserve the aliases.

At a step 66, the interpolated echo samples are analyzed in the frequency domain, such as by calculating a fast Fourier transform (FFT) to create multiple spectra of the moving blood flow in the range gate. One of the multiple spectra produced by the FFT indicates the proper frequency shift and direction of the moving tissue. However, it is generally not possible to determine which spectra of the multiple spectra created from the interpolated echo samples is the correct one. Therefore, the Doppler frequency shift calculated at step 60 is used to select the correct spectra. At a step 68, the desired spectra is extracted using a windowing filter used to select the desired spectrum for the number of repeated spectra produced by the FFT. Alternatively, it is possible to extract the desired spectra by filtering the interpolated echo samples with a band pass filter that is centered about the Doppler shift calculated and then performing the frequency domain analysis on the filtered echo samples.

Another technique for filtering the desired spectra is to apply a low pass filter to the interpolated echo samples in order to remove the aliases. The filtered data can then be shifted to the proper frequency by modulating the data with a carrier whose frequency is determined based on the frequency shift calculated from the time domain processing. After modulating the interpolated data, the frequency domain processing is performed to display the spectra for the user.

In the method described above, the same echo signals that will be used for the frequency domain analysis are also used for the time domain analysis in order to calculate the velocity of the scatterers in the range gate. However, it may be advantageous to utilize different echo signals to perform the frequency domain analysis and the time domain analysis.

Figure 3A:
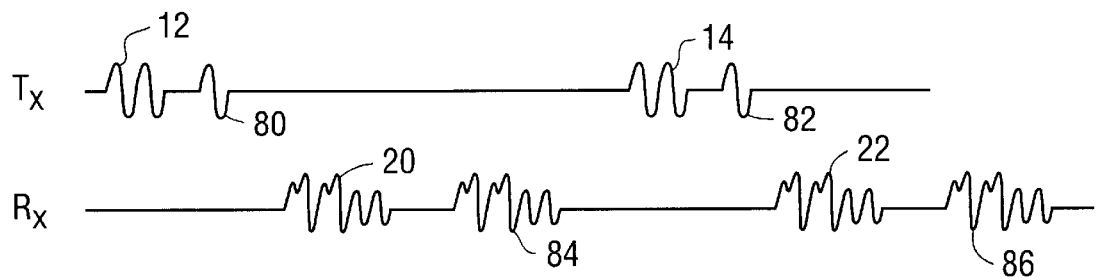
FIGS. 3A and 3B illustrate two additional techniques for generating separate echo signals used in a frequency domain analysis and a time domain analysis in accordance with the present invention.

FIG. 3A illustrates one alternative method by which additional transmit pulses that are optimized to produce echoes for analysis in the time domain are transmitted in order to generate the echo signals used to calculate velocity of the scatterers. In the example shown, the Doppler transmit pulses 12 and 14 are transmitted into the patient at a rate which is generally less than the user-requested PRF. The echo signals 20 and 22 are produced in response to the Doppler transmit pulses 12 and 14, respectively. The Doppler transmit pulses 12 and 14 are optimized to produce echo signals that will be analyzed in the frequency domain but are not optimized to produce echo signals that can be analyzed to determine the velocity of the scatterers in the range gate. Therefore, additional time domain transmit pulses 80 and 82 are transmitted after the Doppler pulses 12 and 14, respectively. The time domain transmit pulses 80 and 82 generate corresponding echo signals 84 and 86. By knowing the time delay between the Doppler pulse 12 and the time domain pulse 80, it is possible to separate the echo signal 20 created in response to the Doppler pulse 12, from the echo signal 84 created in response to the time domain pulse 80. The echo signals 84 and 86 are used to calculate the velocity of the scatterers in the area of tissue defined by the range gate as described above. From the velocity, the Doppler shift of the scatterers can be determined and the interpolated echo data created in response to the Doppler transmit pulses can be properly filtered to select the correct spectra of the moving blood flow.

Figure 3B:
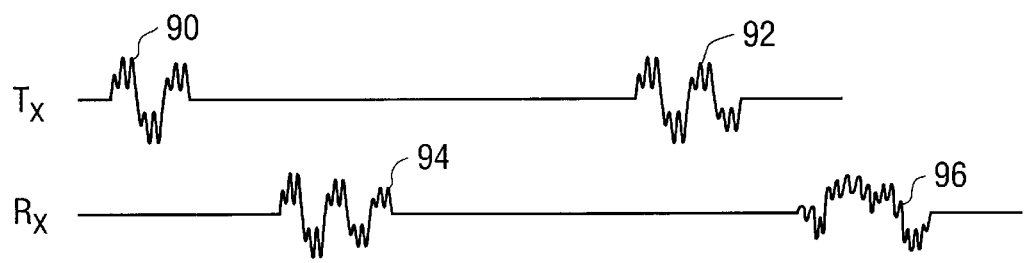

An alternative embodiment of the invention that utilizes separate pulses to generate echo signals for analysis in the frequency domain and echo signals for analysis in the time domain is shown in FIG. 3B. Here, a combined pulse 90 includes both the Doppler transmit pulse and the time domain transmit pulse. Preferably, the time domain pulse has a different frequency than the Doppler transmit pulse and can therefore be superimposed on the Doppler pulse. The combined pulse 90 generates a corresponding combined echo signal 94 having some frequency components that are due to the Doppler transmit pulse and others that are due to the time domain transmit pulse. These components can be filtered in order to remove the Doppler echo signal from the time domain echo signal. Again, a pair of subsequently occurring time domain echo signals are used to calculate the velocity of the scatterers in the area of tissue defined by a range gate and the velocity used to calculate the Doppler shift. The Doppler shift calculated from the time domain analysis is used to select the correct spectra produced by the frequency domain analysis of the interpolated frequency domain echo signals for display to a user.

Another use of the present invention is to utilize higher amplitude transmit pulses to create echo signals in the body. For example, if a user requests a PRF that would otherwise require the ultrasound system to lower the amplitude of each pulse transmitted in order to avoid exceeding the amount of ultrasonic energy that can be delivered to the patient per unit time, the PRF of the ultrasound system can be reduced thereby allowing the ultrasound system to transmit higher amplitude pulses. Echo signals created in response to the higher amplitude (but lower PRF) transmit pulses can be analyzed in the time domain to determine the Doppler shift of the scatterers. The undersampled echo signals are then interpolated up to the user requested PRF in order to select the correct spectra to be produced by the frequency domain analysis of the interpolated echo signals. By using the larger amplitude transmit pulses, a better signal-to-noise ratio of the received echo signals is obtained while not exceeding the limit of how much ultrasonic energy can be delivered to the patient per unit time.

The present invention can also be adapted to HPRF techniques whereby the transmit rate of pulses delivered to a patient can be reduced. Echo signals received from multiple depths can be analyzed in the time domain to determine the Doppler shift. The echo signals can then be interpolated and analyzed in the frequency domain. The previously determined Doppler shift is used to select the correct spectra for display to a user.

The embodiments of the invention in which an exclusive property or privilege is claimed are defined as follows:

1. A method of producing spectral data at a desired pulse repetition frequency (PRF), comprising:
   transmitting a series of Doppler pulses into a patient at a rate which is less than the desired pulse repetition frequency;
   receiving an echo signal from one or more scatterers in an area of tissue defined by a range gate in response to each Doppler pulse transmitted;
   estimating a Doppler shift of the one or more scatterers that created the echo signals received;
   interpolating the received echo signals to create interpolated echo signals that are similar to those which would be received if the Doppler pulses were transmitted at the desired pulse repetition frequency; and
   using the Doppler shift estimated to select a spectrum of the one or more scatterers created from a frequency domain analysis of the interpolated echo signals.

2. The method of claim 1, wherein the estimate of the Doppler shift of the one or more scatters is created by:

performing a time domain analysis of the received echo signals.

3. The method of claim 2, wherein the time domain analysis is performed by:

calculating a correlation between the echo signals received in response to successive Doppler pulses transmitted to estimate a distance and direction that the one or more scatters have moved between the successive Doppler pulses;

dividing the distance estimated by the time between the transmission of successive Doppler pulses to calculate a velocity; and using the distance and velocity to calculate a Doppler shift.

4. The method of claim 1, wherein the Doppler shift is estimated by:

analyzing the echo samples created in response to the series of Doppler pulses transmitted.

5. The method of claim 1, wherein the Doppler shift is estimated by:

transmitting additional pulses into the patient;

receiving additional echo signals created in response to the additional pulses transmitted; and analyzing the additional echo signals received to estimate the distance and direction that the one or more scatterers have moved between the transmission of the additional pulses.

6. The method of claim 5, wherein the additional pulses are transmitted by:

interleaving the additional pulses with the series of Doppler pulses transmitted.

7. The method of claim 5, wherein the additional pulses are transmitted by:

simultaneously transmitting an additional pulse with a Doppler pulse, the additional pulse having a different frequency than the Doppler pulse; and filtering echo signals received in response to the simultaneously transmitted Doppler and additional pulse to separate an echo created in response to the additional pulse and the echo signal created in response to the Doppler pulse.

8. The method of claim 1, wherein the received echo signals are interpolated by:

creating an average sample of the echo signal received in response to each Doppler pulse; and interpolating the averaged samples to produce a number of averaged samples substantially equal to the number of averaged samples that would have been produced if the Doppler pulses were transmitted at the desired PRF.

9. The method of claim 1, wherein the ultrasound system operates in a high pulse repetition frequency mode wherein echo signals are received from more than one area of tissue at the same time.

10. The method of claim 1, wherein the spectrum is selected by:

modulating the interpolated echo signal with a carrier having a frequency determined by the time domain analysis; and performing a frequency domain analysis on the modulated, interpolated echo signal.

11. The method of claim 10, further comprising:

filtering the interpolated echo signal before modulating the interpolated echo signal to remove aliases.

12. The method of claim 10, further comprising:

filtering the modulated, interpolated echo signal to remove aliases.

13. The method of claim 1, further comprising:

increasing the amplitude of the Doppler pulses transmitted compared with the amplitude that would be transmitted at the desired pulse repetition frequency.

* * * * *